INVENTOR.
R. A. KOBLE

INVENTOR.
R. A. KOBLE
BY Hudson & Young
ATTORNEYS

United States Patent Office 2,993,342
Patented July 25, 1961

2,993,342
RECOVERY OF RARE GASES FROM SYNTHETIC
AMMONIA PLANT PURGE GASES
Robert A. Koble, Bartlesville, Okla., assignor to Phillips
Petroleum Company, a corporation of Delaware
Filed Mar. 29, 1957, Ser. No. 649,508
6 Claims. (Cl. 62—22)

This invention relates to the separation of rare gases from gaseous mixtures containing them. In one aspect it relates to a method for recovering helium and argon separately from synthetic ammonia plant purge gases.

As is well known, the rare gas argon is present in the atmosphere to the extent of about one percent and many processes for separating atmospheric oxygen and nitrogen involve separation of argon, particularly in case the oxygen and nitrogen are to be produced as pure gases. It is also known that a trace of helium also occurs in air but its separation is usually not warranted.

Synthetic ammonia manufacture involves use of air and the unreacted synthesis gas or purge gas or gases, as they are frequently called, from such a plant contains the argon from the air used. The unreacted synthesis gas is recycled in the operation and the content of argon accordingly increases. Since argon is an inert gas, a small fraction of the unreacted synthesis gas must be withdrawn as a purge gas from the operation in order to hold down the concentration of argon. In ordinary ammonia synthesis the presence of helium presents no problem because of its very low concentration in the atmosphere and it is usually not present in the natural gas used in greater than trace concentrations.

However, when manufacturing synthetic ammonia from Texas Panhandle natural gas, the inert gas problem in ammonia purge gas is different. As is well known, the Texas Panhandle natural gas contains an appreciable concentration of helium and this gas, along with argon from the atmosphere, accumulates in the ammonia plant purge gases.

Because of the presence of relatively high concentrations of helium and argon in the purge gases, both gases being inert, appreciable proportions of the purge gases must be withdrawn from the ammonia production system. Because of their general utility, I have devised a process for recovering helium and argon separately from Texas Panhandle synthetic ammonia plant purge gases.

An object of my invention is to provide a process for separating helium and argon as separate products from synthetic ammonia plant purge gases.

Another object of my invention is to provide a method for the recovery of such gases in relatively pure form.

Still another object of my invention is to provide a process for the separation and recovery of these inert gases with the simultaneous recovery of nitrogen, the latter being usable as recycle gas in the ammonia synthesis operation.

Yet another object of my invention is to provide a method for the above-mentioned separation of gases in which an appreciable proportion of the hydrogen content of the purge gases is also recovered for reuse in the synthesis operation.

Still other objects and advantages of my invention will be realized upon reading the following description which, taken with the attached drawing, forms a part of this specification.

In the drawing—

My invention is directed particularly to a method for recovering helium from a feed gas comprising helium, argon, nitrogen and hydrogen, comprising the steps of cooling said gas to a subatmospheric temperature at a superatmospheric pressure thereby producing liquid, separating the uncondensed gas from said liquid, the gas phase comprising helium and hydrogen, passing this gas phase into an oxidation zone and therein combining hydrogen of said gas with oxygen to form water, removing the water from the combustion zone effluent and recovering the resulting helium therefrom as a product of the operation. The oxygen used in the above-mentioned oxidation step is atmospheric oxygen or, if desired, the oxygen is the oxygen of a metallic oxide reducible by hydrogen. One embodiment of the invention involves separation and recovery of argon as well as helium.

Figure 1:
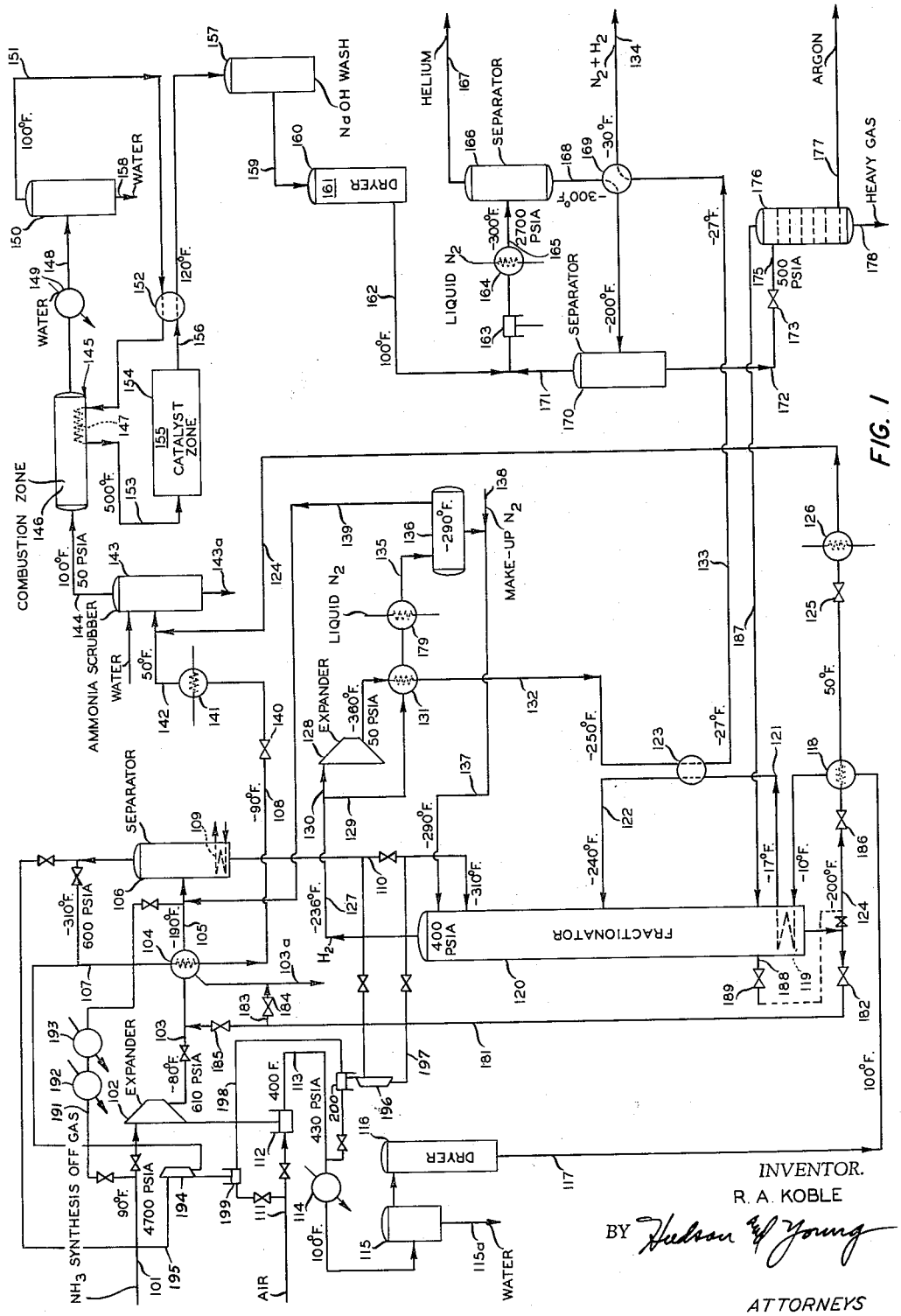
FIGURE 1 illustrates, in diagrammatic form, an arrangement of apparatus parts for carrying out the process of my invention.

Referring now to the drawing and specifically to FIGURE 1, and illustrative of the operation of my process, an ammonia synthesis plant off-gas or purge gas, from a source not shown, is passed at a pressure of about 4700 p.s.i.a. (pounds per square inch absolute) at about 90° F., through a pipe 101 to an expander 102. On passing through expander 102 the pressure of the gas is reduced to about 610 p.s.i.a. with the simultaneous reduction of temperature to about —80° F. by expansion. Expander 102 can be any suitable type of expansion apparatus which is adapted for operation at such low temperatures. The expander or, as it may be called, the expansion engine 102 can be of such type as a turbine or reciprocating expander, of which the Kapitza turbine is an example of the former. Suitable forms of Kapitza turbines are disclosed in U.S. Patent No. 2,280,585, granted April 21, 1942.

From the expander 102 the cooled gas is passed through a pipe 103 into a more or less conventional heat exchanger 104 or it is, in some cases, a small vessel containing a heat exchange coil. In any event a sump is provided into which any condensate produced in the expander can run so that it can be withdrawn through a pipe 103a for such disposal as desired. In exchanger 104 the temperature of the gas is reduced to about —190° F. by indirect heat exchange with a gaseous material as subsequently produced. Effluent from heat exchanger 104 at the last-mentioned temperature passes through a pipe 105 into a separator vessel 106. Vessel 106 is provided with a heat exchange coil 109 in which is circulated refrigerant liquid nitrogen. This liquid nitrogen boils at a temperature of about —320° F. under atmospheric pressure, and at this temperature the refrigerant cools the contents in separator 106 to a temperature of about —310° F. At this latter temperature a gas phase is removed from separator 106 by way of the pipe 107 and is passed through heat exchanger 104 as the aforementioned refrigerant as subsequently produced. The refrigerant gas from the coil in exchanger 104 issues at a temperature of about −90° F. under a pressure of about 600 p.s.i.a. This gas passes from a pipe 108 through an expansion valve 140 and thence through a refrigerant economizer 141 for the recovery of useful refrigeration. The gas issues from economizer 141 at a temperature of about 50° F. under a pressure of approximately 50 p.s.i.a. and passes on under these conditions via pipe 142 into a scrubber vessel 143.

In separator vessel 106 separation is accomplished between helium and argon, most of the hydrogen going with the helium as gas through pipe 107 and some hydrogen, along with the major portion of the nitrogen, going with the argon as liquid bottoms passing through a pipe 110 into a fractionator 120, to be described hereinbelow.

Air, taken into the system through a pipe 111, is compressed by compressor 112 to a pressure of about 430 p.s.i.a. and has a temperature of about 400° F. Compressor 112 is preferably powered by the power available from the expansion engine 102. Compressed air under the above-mentioned conditions is passed from compressor 112 through a pipe 113 to a cooler 114. In this cooler the air is cooled to about 100° F. Water condensing from the compressed air is separated in a separator 115 and is withdrawn through a pipe 115a. The air from separator 115 is passed through a dryer 116. This dryer is provided with a solid desiccant material such as silica gel, or the like, or if desired, a liquid desiccant such as one or more of the ethylene glycols or the like is used. From dryer 116 dehydrated air is passed through a pipe 117 to a heat exchanger 118 in which the temperature of the air is reduced to about −10° F. The temperature of the air is further decreased in a reboiler coil 119 in fractionator 120 to about −17° F. and is then passed through a pipe 121 into a refrigerated heat exchanger 123. In the refrigerated exchanger the air is chilled to a temperature of about −240° F. and it is then passed through a pipe 122 into fractionator 120. The reboiler coil 119 is an indirect heat exchanger for reboiling the contents of the fractionator with air being cooled. It is intended in this fractionator to produce a bottoms product consisting largely of a liquid solution of oxygen and argon. Since hydrogen, of course, boils at a temperature considerably below the boiling points of oxygen and argon, the overhead gases from fractionator 120 contain nearly all of the hydrogen carried into the fractionator through the condensate from the separator 106. This condensate from separator 106 also contains most of the nitrogen contained in the original feed gas to the operation. Of course, a large proportion of nitrogen is introduced into fractionator 120 as a component of the chilled air from pipe 122. Fractionator 122 then separates as an overhead product the hydrogen and substantially all of the nitrogen. This overhead gas issues from fractionator 120 at a temperature of about −236° F. and pressure of about 400 p.s.i.a. This overhead product stream from pipe 127 is divided into two portions, one portion passing through a pipe 130 and the other portion through a pipe 129. The portion passing through pipe 130 passes through an expander 128 which is similar to the expander described above. Gas issuing from expander 128 possesses a temperature of about −360° F. at about 50 p.s.i.a. This very cold portion of the overhead gas passes through an exchanger 131 and chills for condensation purposes the portion of overhead gas from pipe 129. This chilled portion of gas is further chilled in a liquid nitrogen chilled exchanger 179 to a temperature of about −290° F. This chilled material passes from exchanger 179 through a pipe 135 into a reflux accumulator 136 from which liquid, which is largely liquid nitrogen, is passed through a pipe 137 into the upper portion of fractionator 120 for refluxing purposes. In case make-up nitrogen for refluxing purposes is needed in this fractionation operation it is introduced through a pipe 138.

The expanded portion of the overhead material from fractionator 120 is passed from exchanger 131 through a pipe 132 into the refrigerated exchanger 123 for chilling the compressed air prior to its introduction into the fractionator. The effluent refrigerant from exchanger 123 at a temperature of about −27° F. is passed through a pipe 133 to a heat exchanger 169. The gas issues from this exchanger at about −30° F. and is withdrawn from the system through a pipe 134 as a nitrogen and hydrogen containing product. This gas can be passed from pipe 134 to any desired refrigeration recovery operation after which it can be, if desired, recycled to the ammonia synthesis operation.

The bottoms from fractionator 120 are largely argon and oxygen but contain a small proportion of methane and ammonia. This bottoms material leaves fractionator 120 through a pipe 124 at a temperature of about −200° F. at the fractionator pressure of about 400 p.s.i.a. These bottoms are passed through a pressure reducing valve 186, thence through the heat exchanger 118 from which the bottoms issues at a temperature of about 50° F. Pressure is further reduced in valve 125 after which further refrigeration is recovered in a refrigeration economizer 126. From the economizer 126 the bottoms pass on through a pipe 124 and are added to the warm overhead gases from separator 106 in pipe 142. This combined stream, which then contains helium, argon, oxygen, hydrogen and only a very small proportion of nitrogen and hydrocarbon, is passed into a scrubber vessel 143 mentioned above. In this scrubber water removes the final traces of ammonia, the aqueous ammonia being withdrawn through a pipe 143a. The ammonia-free gas then leaves scrubber 143 and is passed through a pipe 144 at a temperature of about 100° F. under 50 p.s.i.a. into the combustion zone 146 of a waste heat boiler 145. In this combustion zone the hydrogen burns to water and also any methane present burns to carbon dioxide and water. Effluent gases from this boiler are cooled in a water cooled heat exchanger 149 and the cooled gases pass on through a pipe 148 into a water knockout drum 150. Water is withdrawn therefrom through a pipe 158 and the gases are passed through pipe 151 and are heated in a heat exchanger 152, and are further heated in a coil 147 in boiler 145. These gases thus heated to about 500° F. are passed through a pipe 153 into a vessel 154 containing a catalyst 155.

In case the heated gases from pipe 153 contain an excess of oxygen, the catalyst in this zone is such a catalyst as Baker deoxo-catalyst or, in case the gas contains an excess of hydrogen, the catalyst is, for example, a Houdry oxi-catalyst, a metallic oxide reducible by hydrogen, such as copper oxide, or iron oxide. In any event whether the heated gas entering vessel 154 contains an excess of oxygen or an excess of hydrogen, either one of the gases is removed and the oxygen-free and hydrogen-free gas leaves this catalyst zone through a pipe 156 and passes through the heat exchanger 152. The cooled gas from heat exchanger 152 has a temperature of about 120° F. and is freed of carbon dioxide in a caustic scrubber 157 from which the gas is passed through pipe 159 into a dryer vessel 160. This vessel 160 is provided with a solid dessicant 161 or with a liquid desiccant, as mentioned hereinabove relative to dryer vessel 160. Dehydrated gas from dryer 160 is passed through a pipe 162 at a temperature of about 100° F., is compressed in a compressor 163 and is chilled by refrigerant liquid nitrogen in a refrigerated exchanger 164 to a temperature of about −300° F. Compressor 163 is intended to compress the dehydrated gas to a pressure of about 2700 p.s.i.a. Thus, the chilled gas at −300° F. and 2700 p.s.i.a. enters separator vessel 166, in which an overhead gas product is separated, and leaves the system through a pipe 167 as the helium product of the operation, for such disposal as desired. Under some conditions, if desired, the helium passing through pipe 167 is passed through a charcoal adsorber, similar to adsorber 51 in FIGURE 2 thereby producing a pure product. The condensate produced in exchanger 164 is withdrawn from the separator through a pipe 168 and is heat exchanged with the above-mentioned nitrogen and hydrogen product stream in heat exchanger 169 to a temperature of about −200° F. At this latter temperature the bottoms product passes into a separator 170 from which gases are removed through an overhead pipe 171 for recycling to compressor 163 while liquid is passed through a pipe 172 through an expansion valve 173 for passage into a fractionator 176 by way of a pipe 175. On passage through the expansion valve 173 the pressure is reduced to about 500 p.s.i.a. and this pressure is sufficient in fractionator 176 to effect an excellent separation of the argon, with the argon being withdrawn as a sidestream through a pipe 177. This argon product contains only a trace of nitrogen, other gases in the system having been entirely removed from the argon. Column bottoms is removed through a pipe 178 for such disposal as desired. This bottoms contains only a very small proportion of the argon treated in the system as an impure product containing materials higher boiling than argon. Overhead gases from fractionator 176, which contain some argon and nitrogen, are passed through a pipe 187 into the lower portion of fractionator 120 as recycle material.

Uncondensed gases from the reflux accumulator 136 are passed therefrom by way of a pipe 139 and added to the material in pipe 105 prior to its introduction into separator 106.

If desired, the main bottoms product from fractionator 120, which is rich in atmospheric oxygen, can be removed from the fractionator as a side-stream through a pipe 188. This withdrawn material from pipe 188 can, if desired, be passed through pipe 124 and though the expansion valve 186 and thence on to pipe 142. When the main oxygen containing product is withdrawn through pipe 188 as a sidestream, a small bleed stream is taken from the kettle section of this fractionator through a pipe 181 containing a valve 182 and is passed on through a valve 185 and is recycled into the ammonia synthesis gas charge stock to the system, passing through pipe 103. However, in case it is desired to dispose of this small volume of bleed material from the bottom of fractionator 120, valve 185 is closed and valve 184 in pipe 183 is opened and this bottoms bleed material is combined with the waste material passing through pipe 103a for such disposal as desired.

The separation carried out in separator 106 is, under some conditions, carried out at a higher pressure than 600 p.s.i.a., for example, at from 1,000 to 2,000 p.s.i.a. Under such higher pressures a portion of the hydrogen which leaves separator 106 at lower pressures with the helium will be forced into solution in the liquid argon and removed from this separator through pipe 110. In this manner a larger portion of the hydrogen is recovered from the system in the overhead gas from the fractionator 120 in pipe 134. Also, the air requirement for burning the hydrogen from the helium in the combustion zone 146 is considerably reduced.

Furthermore, if desired, the separation in separator 106 can be made at full line pressure, that is 4700 p.s.i.a. In this case refrigeration of the charge gas to the system passing through pipes 101 and 191 for producing feed to the separator at −190° F. must be supplied from another source, as exchangers 192 and 193. However, in this case the separated helium containing overhead gas and the liquid argon bottoms from separator 106 can be expanded separately with the production of the work. These separate expansions are then carried out in expansion engines, 194 in pipe 195, and 196 in pipe 197, similar to that described above relative to expander 102 and the available work so produced is used to compress the air in compressors 199 and 200, respectively, in conduit 198. In this manner only a minimum amount of air is required for burning the small portion of hydrogen accompanying the helium while a major portion of the hydrogen is recovered from fractionator 120 through pipe 134, along with the nitrogen for recycling to the synthetic ammonia plant.

Another variation of the process as herein described is that in case only one pure product stream is desired, that is, either a pure helium stream or a pure argon stream, but not both, the catalyst containing vessel 154 is omitted. In this case an excess of oxygen in the gas will accompany the argon, leaving a pure helium product, while an excess of hydrogen will accompany the helium, thus leaving the argon as a pure product.

Another variation of my invention involves burning the hydrogen following the expansion step in expander 102. In this manner the combustion zone and boiler combination 145, with all apparatus parts to and including dryer 160, would be inserted following expander 102 and, of course, the substituted parts would not be employed as illustrated in FIGURE 1. However, such a procedure is not desired because all of the hydrogen is removed as water without recovery of any hydrogen whatever for reuse in the synthetic ammonia plant. Thus, in pipe 134 only nitrogen would be recovered from the system.

The following tabulation gives product stream compositions at various portions of the flow diagram illustrated in FIGURE 1:

EXAMPLE I

*Material balance, mols per hour, principal components*

|  | (101) | (111) | (107) | (110) | (139) | (134) | (187) | (124) | (144) | (162) | (167) | (168) | (171) | (172) | (177) | (178) | (103a) |
|---|---|---|---|---|---|---|---|---|---|---|---|---|---|---|---|---|---|
| Hydrogen | 55 |  | 46.0 | 10.6 | 1.6 | 9.0 |  |  | 46.0 |  |  |  |  |  |  |  |  |
| Helium | 5 |  | 4.9 | 0.4 | 0.3 | 0.1 |  |  | 4.9 | 4.9 | 4.9 | 0.1 | 0.1 | Trace |  |  |  |
| Nitrogen | 18 | 83.2 | 0.8 | 17.8 | 0.6 | 101.2 | 1.0 | 0.2 | 1.0 | 1.0 | Trace | 1.5 | 0.5 | 1.0 | Trace |  |  |
| Argon | 4 | 1.0 | 0.1 | 3.9 |  | 0.05 | 0.05 | 4.9 | 5.0 | 5.0 | Trace | 5.1 | 0.1 | 5.0 | 4.9 | 0.05 |  |
| $CH_4 + NH_3$ | 18 |  |  | 3 |  |  |  | 3.0 | 1 2.0 |  |  |  |  |  |  |  | 15 |
| Oxygen |  | 23.0 |  |  |  | 0.1 |  | 23.0 | 23.0 |  |  |  |  |  |  |  |  |
| Total | 100 | 107.2 | 51.8 | 35.7 | 2.5 | 110.45 | 1.05 | 31.1 | 81.9 | 10.9 | 4.9 | 6.7 | 0.7 | 6.0 | 4.9 | 0.05 | 15 |

1 $CH_4$ only in stream 144.

Figure 2:
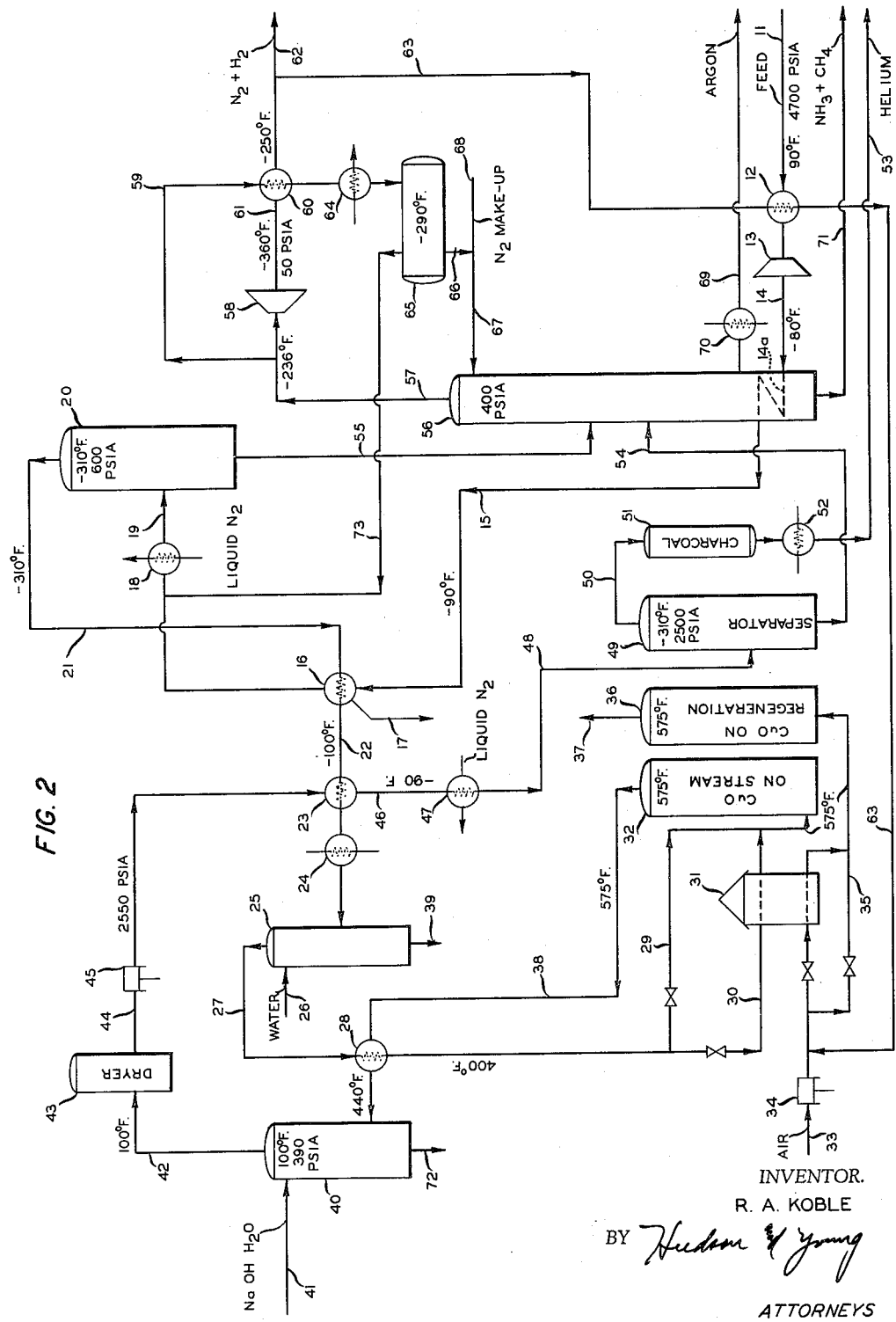
FIGURE 2 illustrates, also in diagrammatic form, an arrangement of apparatus parts for carrying out a modified version of the process of FIGURE 1.

In the embodiment illustrated in FIGURE 2, atmospheric oxygen is not used for burning the hydrogen to water. To remove the hydrogen I employ a metallic oxide reducible by hydrogen for removal of hydrogen from the helium. In FIGURE 2 a feed stock similar to that disclosed in the above tabulation enters the system, from a source not shown, throught a pipe 11. This feed material enters the system at a temperature of about 90° F. under a pressure of 4700 p.s.i.a. and is cooled in a heat exchanger 12 and is further cooled by expansion in an expander 13 to about −80° F. The feed then passes by way of a pipe 14 through a reboiler coil 14a in which it is further cooled to a temperature of about −90° F. At −90° F. the feed passes through a pipe 15 to a heat exchanger 16 in which condensate is separated and removed through a pipe 17, the gas passing on to a refrigerated exchanger 18. In this exchanger the gas is chilled by indirect heat exchange with refrigerant liquid nitrogen, the gas issuing from this exchanger at a temperature of about −310° F. and it is passed through a pipe 19 into a separator 20. Separation is carried out in this vessel at −310° F. under 600 p.s.i.a. with the separated gas passing through a pipe 21 to the above-mentioned heat exchanger 16. This cold gas thus assists in refrigerating the feed gas. From this exchanger the separated gas at about −100° F. is passed through a pipe 22 to an exchanger 23 in which the gas is warmed somewhat. From exchanger 23 further refrigeration is recovered in a refrigeration economizer 24 with the gas passing on into an ammonia scrubber 25. Water for scrubbing ammonia from the gas enters the scrubber through a pipe 26 and the aqueous ammonia solution is removed through a pipe 39 for such disposal as desired. The scrubber gas passes through a pipe 27 and is heated in an exchanger 28 to about 400° F. This so-heated gas passes on through a pipe 30 and is further heated in a heater 31 to a temperature of about 575° F., at which temperature the gas enters a metallic oxide containing vessel 32. By-pass pipe 29 by-passes a portion of the gas from line 27 around heater 31 in case temperature adjustment of the heated gas is required. Thus, temperature of the gas entering the oxide containing vessel 32 is easily regulated.

In vessels 32 and 36 are placed quantities of metallic oxide which are reducible by hydrogen, such as copper oxide, or such an iron oxide as $Fe_2O_3$. In these vessels the hydrogen is removed from the gas stream by combination with the oxygen from the oxide thereby reducing the oxide to metal and with the production of water. The moist, hot gas stream issuing, for example, from vessel 32 is passed through a pipe 38 into the aforementioned heat exchanger 28 in indirect heat exchange with the feed gases to the oxide tower. On passing through exchanger 28 these hot gases are cooled from about 575° F. to about 440° F. and are then passed into a caustic washer vessel 40 in which aqueous caustic, from a pipe 41, washes the gases with the result that the gases are cooled to about 100° F. Used caustic solution is withdrawn through pipe 72. Pressure in caustic washer 40 is about 390 p.s.i.a. and at this pressure the gases pass on through a pipe 42 and are dried in a dryer 43. This dryer is charged with a solid desiccant or, if desired, dryer 43 is a glycol dryer. The thus dried gas passes on through a pipe 44 and is compressed by a compressor 45 to a pressure of about 2,550 p.s.i.a., the hot compressed gases passing in indirect heat exchange (23) with the gases from pipe 22. The compressed gas issues from exchanger 23 at about −90° F. and is passed through a pipe 46 and in indirect heat exchange with refrigerant nitrogen in an exchanger 47. From this exchanger the chilled compressed gas passes through a pipe 48 into a separator vessel 49.

In separator 49 a helium rich gas is removed through a pipe 50 and is passed through a vessel 51 charged with adsorbent charcoal. From this absorber the gaseous helium passes through a refrigeration economizer 52 and thence leaves the system through a pipe 53 for disposal as desired. In the adsorber 51 other material than charcoal can be used providing it is suitable for removing final traces of impurities from the helium.

Liquid separating in separator 49 is passed therefrom through a pipe 54 into about the mid-point vertically of a fractionator 56. Liquid separated in separator 20 is also charged to fractionator 56 through a pipe 55. The materials charged to the fractionator in pipe 55 are rich in hydrogen and contain considerable nitrogen and are the charge materials from which the argon product is recovered. The fractionator is operated at a pressure of about 400 p.s.i.a. with an overhead temperature of about −236° F. It is this fractionator 56 which is reboiled by the expanded charge stock to the system in reboiler coil 14a, as mentioned hereinbefore. Overhead gaseous material leaves the fractionator through an overhead pipe 57, a portion of this overhead material being expanded in an expander 58 to a temperature of about −360° F. This chilled and expanded gas passes through a pipe 61 and enters a heat exchanger 60 in indirect heat exchange with the remaining portion of overhead gas passing through a pipe 59. This heat exchange is intended to produce condensate or at least to chill a portion of the overhead gas so that a final refrigeration step with refrigerant nitrogen will produce condensate for refluxing fractionator 56. Thus, chilled overhead gas is passed from exchanger 60 to the refrigerated exchanger 64 for indirect heat exchange with refrigerant nitrogen from which condensate and gas pass on to a reflux accumulator 65. Condensate is passed from accumulator 65 at a temperature of about −290° F. through pipes 66 and 67 as reflux to fractionator 56. Make-up nitrogen, as required for refluxing, is introduced to the system through a pipe 68.

A preferred mode of operating fractionator 56 is to remove the argon product as a sidestream through a pipe 69 at a level somewhat above that of the reboiling section of the column. The argon as removed is, of course, very cold and it is passed through a refrigeration economizer 70 and thence through pipe 69 for such disposal as desired. The bottoms product from fractionator 56, containing some argon and traces of nitrogen, methane and ammonia, is passed through a pipe 71 for such disposal as desired. If desired, this bottoms product can be treated for ammonia and methane removal and the remaining argon and nitrogen recycled to pipe 11 for increasing ultimate recovery of argon; or stream from pipe 71 is added to the feed in pipe 11 without first removing ammonia and methane because these gases are condensed in heat exchanger 16 and are removed as condensate in pipe 17.

The expanded portion of the overhead gas issuing from exchanger 60 is withdrawn from the system at a temperature of about −250° F. through a pipe 62 for such disposal as desired. This material is a hydrogen and nitrogen containing product.

When a metallic oxide containing vessel, as 32 or 36, is depleted as far as the oxide content is concerned, it is regenerated by reoxidizing the metal to oxide. In FIGURE 2 vessel 36 is a second oxide containing vessel which is illustrated as being on the regeneration portion of the cycle. To regenerate the reduced metal to oxide, it is merely necessary to pass heated air through the vessel. Thus, air from pipe 33 is pumped by pump 34 with heat being supplied by heater 31 and the heated air at about 575° F. passing to vessel 36. By-pass pipe 35 by-passes a portion of the air around heater 31 in case temperature adjustment of the regeneration air is required. Off gases from the regeneration vessel 36 pass therefrom through a pipe 37 to such disposal as desired.

Vessels 32 and 36 are, of course, on stream and on regeneration automatically and the piping illustrating such automatic operation is not shown in the drawing, for purposes of simplicity. Such piping is well understood by those skilled in the art.

If desired, a portion of the hydrogen and nitrogen product from pipe 62 is passed through a by-pass pipe 63 and through heat exchanger 12 and passed by way of pipe 35 to the metal oxide containing vessel 36 for removing atmospheric oxygen at the end of the regeneration portion of the cycle. In other words this hydrogen and nitrogen containing gas purges excess oxygen from vessel 36 following regeneration and prior to placing vessel 36 on steam.

As an example of the operation of the embodiment of my invention according to FIGURE 2, the following tabulation illustrates compositions of feed material, intermediate products and final products:

separating conditions and withdrawing a stream of argon therefrom as another product of the operation.

2. A method for recovering helium and argon as separate products from a feed gas comprising helium, argon, nitrogen and hydrogen under a superatmospheric pressure comprising expanding said feed gas from said superatmospheric pressure to a lower pressure with production of work whereby said gas becomes cooled, chilling the cooled gas and separating a liquid phase from a gas phase, the liquid phase comprising argon, nitrogen and hydrogen and said gas phase comprising helium and nitrogen, fractionating said liquid phase thereby producing an overhead gas product and a bottoms liquid, compressing air by the work produced in the aforementioned expanding of said feed gas, cooling this compressed air by indirect heat exchange with a cooling agent and introducing this compressed and cooled air into the aforementioned fractionating operation and fractionating this cooled air and said liquid phase, said overhead product comprising hydrogen and nitrogen and said bottoms liquid comprising argon and oxygen, combining this bottoms liquid with the aforementioned gas phase, passing this combined material into a combution zone and therein reacting by combustion the oxygen and hydrogen to form water, removing effluent from the combustion zone and dehydrating the effluent, compressing and chilling the dehydrated effluent thereby producing condensate, separating uncondensed gas from this latter condensate, the separated gas being the helium product of the operation, fractionating said latter condensate and thereby producing argon as another product of the operation.

EXAMPLE II

*Material balance, mols per hour, principal components*

|  | (11) | (19) | (17) | (55) | (62) | (73) | (54) | (69) | (71) | (21) | (48) | (53) |
|---|---|---|---|---|---|---|---|---|---|---|---|---|
| Hydrogen | 55 | 61.08 | ---- | 10.60 | 4.52 | 6.08 | ---- | ---- | ---- | 50.48 | trace | trace |
| Helium | 5 | 5.28 | ---- | 0.40 | 0.12 | 0.28 | ---- | ---- | ---- | 4.88 | 4.88 | 4.88 |
| Nitrogen | 18 | 19.42 | ---- | 18.62 | 17.96 | 1.42 | 0.8 | 0.04 | trace | 0.80 | 0.80 | trace |
| Argon | 4 | 4.00 | ---- | 3.9 | 0.04 | ---- | 0.1 | 3.92 | 0.04 | 0.1 | 0.1 | trace |
| $CH_4$ | 10 | ---- | 10 | ---- | ---- | ---- | ---- | ---- | trace | ---- | ---- | ---- |
| $NH_3$ | 8 | ---- | 8 | ---- | ---- | ---- | ---- | ---- | trace | ---- | ---- | ---- |
| Total | 100 | 89.78 | 18 | 33.52 | 22.64 | 7.78 | 0.9 | 3.96 | 0.04 | 56.26 | 5.78 | 4.88 |

The values given in both tabulations of this disclosure are in terms of mols of gas.

It will be realized by those skilled in the art that many valves, pressure and temperature indicating and/or recording devices, flow indicating and/or recording devices and other auxiliary apparatus ordinarily used in such operations are not illustrated in the drawing nor described, for purposes of simplicity. The need for such equipment, its installation and operation, are well understood by those skilled in the art. It is further realized that pipe and tanks and other vessels in which refrigerated products are passed require suitable insulation.

The flash separation in vessel 20 can, as stated relative to FIGURE 1, be carried out at a pressure higher than the 600 p.s.i.a. mentioned relative to vessel 20. In this case more of the hydrogen is forced into the condensate in vessel 20, and, accordingly, more hydrogen is recovered in the product stream issuing through pipe 62.

Also, oxidation of the hydrogen in vessels 32 and 36 can be carried out prior to separation in vessel 20 but, in such cases, recovery of hydrogen in stream 62 will be substantially eliminated. In this latter case, after removal of the hydrogen by the metal oxide, considerably lower pressure is required for the operation of separator vessel 20 for a given helium-nitrogen separation.

It is also realized that pressures and temperatures other than those given as illustrative of the operations can be used. When using other operating conditions, intermediate stream compositions, and product compositions, etc. will of course, vary depending upon the particular conditions used. The herein given operating conditions are merely given as examples of the general operation of the process.

While certain embodiments of the invention have been described for illustrative purposes, the invention obviously is not limited thereto.

I claim:

1. A method for recovering helium and argon as separate products from a gas comprising helium, argon, nitrogen and hydrogen comprising the steps of cooling said gas to a subatmospheric temperature at a superatmospheric pressure thereby condensing liquid, separating condensed liquid from uncondensed gas as separate phases, the gas phase comprising helium and hydrogen, and the liquid phase comprising argon, nitrogen and hydrogen, fractionating nitrogen and hydrogen from said condensed liquid as one product of the process, combining the remainder of the condensed liquid as bottoms from the fractionating operation with the separated gas phase, passing this combined material into an oxidation zone and therein combining the hydrogen and any other oxidizable gas of the combined material with atmospheric oxygen by combustion to produce water, removing combustion effluent from said zone, separating the so-produced water from the effluent of the oxidation zone, chilling the water-free effluent and condensing a portion thereof, separating uncondensed gas from condensate of this latter operation, withdrawing this separated gas as the helium product of the operation, fractionating this latter condensate under argon 3. The operation of claim 2 wherein said feed gas comprises helium, argon, nitrogen, hydrogen, methane, and ammonia, the first-mentioned liquid phase comprises argon, nitrogen, hydrogen, methane and ammonia, the aforementioned bottoms liquid comprises argon, oxygen, methane and ammonia, and in said combustion zone reacting said oxygen with hydrogen and said methane and ammonia, removing carbon dioxide from the combustion zone effluent prior to said dehydration step, and passing an overhead gas from the final argon fractionation step into the first-mentioned fractionating step.

4. The operation of claim 2 wherein the chilling steps are carried out by indirect heat exchange with refrigerant liquid nitrogen.

5. In the operation according to claim 2, producing reflux for the first-mentioned fractionation step by dividing the overhead gas product of this fractionation step into two portions, expanding one portion to a lower pressure with the production of work whereby said one portion is cooled, cooling the other portion by indirect heat exchange with the expanded and cooled portion, chilling the cooled other portion to a still lower temperature by indirect heat exchange with refrigerant liquid nitrogen whereby condensate is formed, and passing this so-formed condensate into said first-mentioned fractionation step as said reflux.

6. A method for recovering helium from a feed gas which is a synthetic ammonia plant off-gas comprising helium, argon, nitrogen and hydrogen, comprising the steps of cooling said gas to a subatmospheric temperature at a superatmospheric pressure of about 4,700 pounds per square inch absolute thereby producing liquid containing a major proportion of the hydrogen of the gas and argon, separating the uncondensed gas from said liquid, the uncondensed gas comprising helium and a minor proportion of the hydrogen of the feed gas, expanding said uncondensed gas from said superatmospheric to a lower superatmospheric pressure with the production of work, compressing air by the work produced in the gas expanding operation, expanding in a second expanding operation said liquid from said superatmospheric pressure whereby at least a portion thereof is vaporized with the production of work, further compressing the previously compressed air by the work produced in the second expanding operation, chilling the further compressed air, fractionating the vapors and the unvaporized liquid of the second expanding operation and the chilled further compressed air with the production of an overhead gas product comprising hydrogen and a liquid product comprising argon and oxygen, passing this liquid product and the uncondensed gas comprising helium and hydrogen into a combustion zone and therein reacting the oxygen and hydrogen to form water, removing water from the combustion zone effluent, recovering the resulting helium therefrom as a product of the operation, and recovering said overhead gas comprising hydrogen as a second product containing the major proportion of the hydrogen of the feed gas.

References Cited in the file of this patent

UNITED STATES PATENTS

| | | |
|---|---|---|
| 1,658,631 | Dannenbaum | Feb. 7, 1928 |
| 2,019,632 | Ray | Nov. 5, 1935 |
| 2,530,602 | Dennis | Nov. 21, 1950 |
| 2,545,778 | Haringhuizen | Mar. 20, 1951 |
| 2,713,781 | Williams | July 26, 1955 |
| 2,826,480 | Webster | Mar. 11, 1958 |

OTHER REFERENCES

Gas Liquefaction and Low Temperature Rectification, Davies, published by Longmans, Green and Company, Incorporated, New York, pages 178 and 179.